United States Patent Office
3,560,052
Patented Feb. 2, 1971

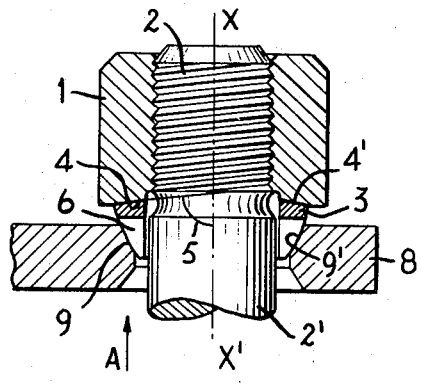
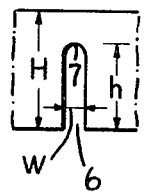
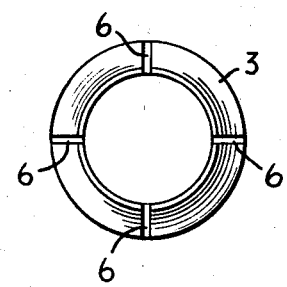
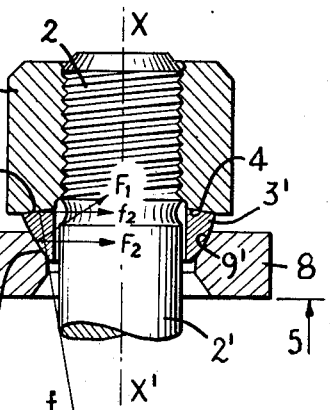
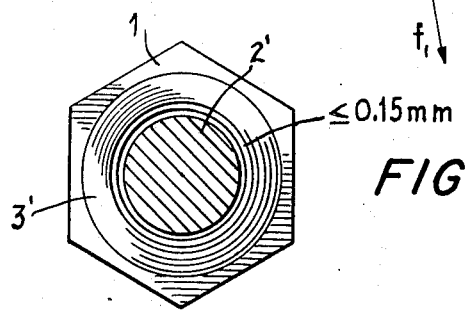

1

3,560,052
DEVICES FOR MOUNTING VEHICLE WHEELS
Henri Verdier, Beauregard-l'Eveque, Puy-de-Dome, France, assignor to Compagnie Generale des Etablissements Michelin, raison sociale Michelin & Cie, Clermont-Ferrand, Puy-de-Dome, France
Filed Oct. 14, 1968, Ser. No. 767,302
Claim priority, application France, Oct. 17, 1967, 124,804
Int. Cl. B60b 3/16
U.S. Cl. 301—9
2 Claims

ABSTRACT OF THE DISCLOSURE

A centering ring mounted around the shank of a vehicle-wheel bolt and gripped between the wheel and a nut has a continuous annular surface in contact with the nut. The ring is nevertheless sufficiently elastic, by virtue of at least one partial slot or by means of a bore selected in such a manner as to leave with the shank of the bolt a sufficiently small clearance, to grip the shank of the bolt when the nut is tightened.

BACKGROUND OF THE INVENTION

The present invention relates to vehicle-wheel-fastening means, especially of the kind comprising a centering collar or ring.

My U. S. Pat. No. 3,386,771 describes an attachment comprising a biconvex or planoconvex centering ring or collar fitting over the shank of a threaded bolt between a locking nut and a hole provided in the wheel disk. The suitably shaped bearing surfaces (plane, conical or spherical) of the collar or ring and the wheel disk assure the centering of the wheel on the hub and a uniform distribution of stresses along the engaged threads of the bolt and nut.

The described centering ring is split in order to increase its elasticity and to enable it to grip the shank of the bolt when the nut is tightened, thereby completing the centering of the wheel and the fixing in place of the elements of the assembly.

The described centering ring works very well. However, when the nut is tightened, the centering ring, which is held tight by friction against the wheel disk, does not follow the nut in rotation. As a result, it is possible for the lips of the split to damage the nut, especially if their edges are sharp and if they are axially offset.

SUMMARY OF THE INVENTION

An object of the present invention is to improve the prior-art centering ring described above. In particular, an object of the invention is to provide a centering ring that cannot damage the nut when the nut is tightened but which nevertheless is so constructed as to grip the shank of the bolt when the nut is tightened.

The foregoing and other objects are attained in accordance with the present invention by the provision, in combination with a bolt and an associated nut, of a biconvex or planoconvex centering ring formed with a bore for passage of the shank of the bolt, the centering ring being characterized (1) in that the surface thereof making contact with the nut and having a suitable shape (plane, conical or spherical) is continuous and (2) in that the ring has nevertheless sufficient radial elasticity to eliminate the clearance between the shank of the bolt and the centering ring bore when the nut is tightened. The latter characteristic is achieved by the provision of at least one slot extending over only part of the height of the ring, by selection of a bore in such a manner as to leave

2 a sufficiently small clearance with the shank of the bolt, or in both ways.

In accordance with a preferred embodiment of the invention, two to four radial slots are provided at equal angular or substantially equal angular distances around the centering ring, the slots having a height ranging from one-half to four-fifths of the height of the ring. Likewise by preference, the diameter of the centering ring bore, taking into consideration the tolerances for machining this diameter and the diameter of the shank of the bolt, is provided in such a manner as to leave, between the bore of the centering ring and the shank of the bolt, a clearance (before the nut is tightened) of 0.1 to 0.4 mm. Furthermore, by preference, the sum of the widths of the slots is larger than the difference between the circumference of the bore of the ring and that of the shank. This sum of the widths is thus at least 1.26 mm. in the case of a diametrical clearance of no more than 0.4 mm.

Of course, it is possible to reduce the height of the slots and also their width. However, in this case it is advisable to reduce the clearance between the bore of the ring and the shank of the bolt. One can even eliminate the slots in the ring altogether, provided the clearance is within the range of 0.1 to 0.15 mm. (before the nut is tightened). Under this condition, the reduction of the bore of the ring by elastic deformation when the nut is tightened facilitates the immobilization of the ring on the shank of the bolt, at least in the case of bolts of 18 to 22 mm. diameter, which are generally used to attach the wheels of industrial vehicles.

BRIEF DESCRIPTION OF THE DRAWING

An understanding of additonal aspects of the invention may be gained from the following detailed description of representative embodiments thereof, in conjunction with the attached drawing, wherein:

FIG. 1 is an axial view, partly in section, of a bolt, a nut, and a slotted centering ring constructed in accordance with the invention, the plane of the section passing through two radial centering-ring slots disposed diametrically opposite each other;

FIG. 2 is a plan view of the ring as seen in the direction of the arrow A in FIG. 1;

FIG. 3 is an elevational view of a segment of the ring, on a scale larger than that of FIGS. 1 and 2;

FIG. 4 is an axial view, partly in section, of a bolt, a nut, and an unslotted centering ring constructed in accordance with the invention, and FIG. 5 is a sectional view taken along the line 5—5 of FIG. 4 and looking in the direction of the arrows.

DESCRIPTION OF THE PREFERRED EMBODIMENTS

FIG. 1 shows a threaded nut 1 screwed onto a threaded bolt 2 having a diameter of 22 mm. A frustoconical surface 4 of the nut 1 bears against a complemental frustoconical surface 4' of a slotted ring 3. The angle 5 of the cone of the surfaces 4 and 4' with respect to the axis X—X' is 80° in the figure but may range from 70° to 90°. The surface 4 may also be spherical.

The ring 3 in accordance with the invention is provided with four slots 6 (see also FIGS. 2 and 3) that extend over only part of its height. The height h of the slots, as shown in detail in FIG. 3, is approximately ¾ of the total height H of the ring.

The width w of each slot 6 is approximately 1 mm., and the bottom 7 of each slot is rounded in order to avoid any cutting or nicking effect. The clearance between the shank 2' of the bolt 2 and the bore of the ring 3 is at maximum 0.25 mm. For the sake of clarity of the drawing, the ring 3 is shown separated from the shank 2' of the bolt 2, although, when it is in place and held tight between the nut 1 and the wheel disk 8, it is in contact with the shank 2' of the bolt 2 and grips it tightly. The ring 3 is formed furthermore with a convex, annular, spherically-curved bearing surface 9 by means of which it engages a complemental, concave, annular, spherically-curved bearing surface 9' of the wheel disk 8.

FIG. 4 shows an assembly identical to that in FIG. 1, except that the ring 3' in FIG. 4 is not slotted and that the clearance between the ring and the shank 2' of the bolt is not more than 0.15 mm. (before the nut is tightened). In this figure are shown (not in accordance with any particular scale) the directions of the forces acting on the ring, whether slotted or not, and causing it to grip the shank of the bolt. The nut 1 exerts on each small segment of the ring a tightening or holding force $f_1$ perpendicular to the surfaces 4 and 4'. This tightening or holding force has a component $f_2$ perpendicular to the axis X–X' and directed towards the axis.

At the same time, the reaction of the wheel disk 8 on the ring 3 produces a force $F_1$ perpendicular to the spherical surfaces 9 tnd 9' and directed towards the center of curvature of the surfaces 9 and 9'. This force $F_1$ has also a component $F_2$ perpendicular to the axis X–X' and directed towards such axis. The total of the forces $f_2$ and $F_2$ tends to tighten the ring 3 or 3' over the shank 2' of the bolt 2. This result is attained by the increase in radial elasticity of the ring thanks to partial slots and/or the choice of a sufficiently small clearance between the shank of the bolt and the ring 3 or 3'.

Thus there is provided in accordance with the invention a novel and highly-effective centering ring that cannot damage the nut when the nut is tightened but which nevertheless is so constructed as to grip the shank of the bolt when the nut is tightened. The device is a significant improvement of conventional fastening means designed to prevent an excessive concentration of stresses on a portion thereof.

I claim:

1. In vehicle-wheel-fastening means comprising a bolt, a nut, and a centering ring formed with a bore for receiving with a small clearance the shank of the bolt, the centering ring being between the wheel and the nut and having a first surface making contact with the nut and a second surface making contact with the wheel, at least one of said surfaces being convex, the improvement wherein the surface of the ring making contact with the nut has a continuous annular shape and the ring is of sufficient radial elasticity to eliminate, in response to the force exerted on the centering ring by the wheel and nut when the nut is tightened, the clearance between the bore of the centering ring and the shank of the bolt, the centering ring being engaged on a nonthreaded portion of the bolt and formed with a number of radial slots not exceeding four, each slot having a height not exceeding ⅘ of the height of the centering ring, the slots collectively having a width exceeding 1.26 mm., and the clearance between the bore of the centering ring and the shank of the bolt not exceeding 0.4 mm.

2. In vehicle-wheel-fastening means comprising a bolt, a nut, and a centering ring formed with a bore for receiving with a small clearance the shank of the bolt, the centering ring being between the wheel and the nut and having a first surface making contact with the nut and a second surface making contact with the wheel, at least one of said surfaces being convex, the improvement wherein the surface of the ring making contact with the nut has a continuous annular shape devoid of projections capable of damaging the nut and the ring is of sufficient radial elasticity to eliminate, in response to the force exerted on the centering ring by the wheel and nut when the nut is tightened, the clearance between the bore of the centering ring and the shank of the bolt, the centering ring being devoid of slots and the clearance between the bore of the centering ring and the shank of the bolt not exceeding 0.15 mm.

References Cited

UNITED STATES PATENTS

| 1,607,274 | 11/1926 | Hecht | 301—9DNX |
| 1,934,971 | 11/1933 | Eksergian | 301—36 |
| 1,940,675 | 12/1933 | Crowther | 301—9DN |
| 2,336,767 | 12/1943 | Ash | 301—9DN |
| 3,386,771 | 6/1968 | Verdier | 301—9DN |

FOREIGN PATENTS

| 1,452,053 | 8/1966 | France | 301—9DN |

RICHARD J. JOHNSON, Primary Examiner

U.S. Cl. X.R.

85—32